United States Patent [19]
Haken

[11] 3,712,109
[45] Jan. 23, 1973

[54] GRAVITY COMPENSATED ACCELERATION MEASURING APPARATUS

[76] Inventor: Klaus Haken, Platenstr. 15, 852 Erlangen, West Germany

[22] Filed: Oct. 5, 1970

[21] Appl. No.: 77,988

[30] Foreign Application Priority Data

Oct. 7, 1969 Germany.................P 19 50 452.0

[52] U.S. Cl. ...............................................73/517 R
[51] Int. Cl.................................................G01p 15/08
[58] Field of Search ..................73/514–517, 178 R, 73/178 T; 235/150.25, 150.2, 150.22

[56] References Cited

UNITED STATES PATENTS 3,094,877 6/1963 Gold....................................73/517 R
3,545,285 12/1970 Hall.....................................73/517 R

*Primary Examiner*—James J. Gill

[57] ABSTRACT

The inertial reactive force on a proof mass being moved on an arbitrary inclined path due to the acceleration in the direction of the path is computed from two components of the bearing pressure of the suspended or supported proof mass, the one component being parallel and the other component being perpendicular to the direction of the path.

8 Claims, 6 Drawing Figures

GRAVITY COMPENSATED ACCELERATION MEASURING APPARATUS

This application is based upon the German patent application P 19 50 452.0, filed Oct. 7, 1969.

For measuring the linear acceleration of an object it is known to measure the inertial reactive force on a proof mass, moved with the object, by a suitable force transmitter. When the object is moving on an inclined path, however, the output signal of the force transmitter will always contain a component which results from the influence of the gravity on the proof mass.

The primary object of the present invention, which relates to an apparatus for providing a measure of the linear acceleration of an object moving on an arbitrary inclined path, is to eliminate the above mentioned influence. This apparatus comprises at least one proof mass and a summing network, the first of whose two input signals is a signal proportional to the force acting on the proof mass in the direction parallel to the path and the second input signal is a signal proportional to the gravity component acting on the proof mass in the direction of the path. This second input signal is obtained by means of a squarer, whose input signal is proportional to the component of the gravity acting on the proof mass in the direction perpendicular to the direction of the path and whose output signal, subtracted from a signal proportional to the square of the weight of the proof mass, is fed to the input of a square-root-extracting function generator (rooter). The basic idea of the invention therefore consists in computing the inertial reactive force due to the acceleration from two components of the bearing pressure of a suspended or a supported proof mass.

Another object is to achieve a high sensitivity of the acceleration measuring apparatus. An additional object of the present invention is to get simple implementations using commercially available accelerometers or only one force transmitter.

The acceleration measuring device anording to the present invention could be advantageously used in the field of aeronautics, automotive or railway engineering, for instance in connection with the indication of sliding of railway traction vehicles without dead axles, as described in the German Patent 1 178 889.

The invention and its further objects will be explained with reference to the following drawings in which.

Figure 1:
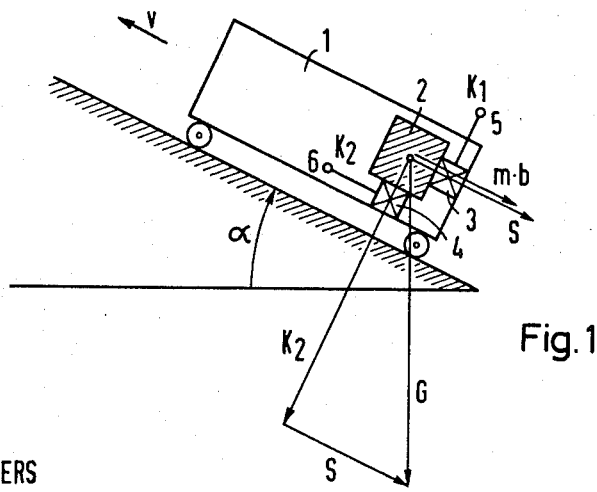
FIG. 1 is a vector diagram illustrating the basic idea of the invention.

Referring to FIG. 1 there is a craft 1 moving upwards on a path with the angle of inclination $\alpha$. This craft has an acceleration $b$ in the direction of the arrow $v$, which is parallel to the direction of the path. At the rear side of the craft a proof mass 2 with the weight G and the mass $m$ is supported by two force transmitters 3 and 4 in directions parallel and perpendicular, respectively, to the direction of the plane of the path. The force effective on the force transmitter 3 in a direction opposite to the moving direction $v$ is represented by a voltage K1 at the output terminal 5 and equals the sum of the inertial reactive force $m \cdot b$ and that component S of the weight of the proof mass, which is by virtue of the gravity effective in the direction of the path.

The other force transmitter 4 measures that gravity component of the weight of the proof mass G, which is effective perpendicular to the direction of the plane of the path, to which component corresponds a voltage K2 at a second output terminal 6. Making use of this directly measurable gravity component K2 it is possible to compute the gravity component S, being effective parallel to the path, according to the relation $S^2 = G^2 - K_2^2$ and from this the quantity $m \cdot b$, which is proportional to the acceleration along the path, can be determined.

Two slightly different implementations of the foregoing are shown in FIG. 2At first that variant shall be considered with the contacts 19 and 20 being in their shown horizontal position. Two accelerometers are mounted on the craft 1 in such a manner, that their sensitive axes, designated by 7 and 8 are placed parallel and perpendicular, respectively, to the direction of the path. Both accelerometers are identical, having the same mechanical structure and proof masses of the same weight G. They may consist in a proof mass (seismic mass) being in mechanical contact with a piezoelectrical crystal, such as disclosed in the U.S. Pat. No. 3,104,334, and are commercially available, for instance, as model Nr. 2221 D, made by the Endevco Corporation, USA, or they may consist in a pendulously supported proof mass, a pickoff to sense displacements of the proof mass, a torquer coil and a restorer servo which causes an electric current to flow through the torquer coil in response to the pickoff signal. Accelerometers of the latter type are commercially available as model QA-116, made by the Endevco Corporation, USA.

At the output terminals 5 and 6 of these accelerometers appear voltages, indicated by K1 and K2, which correspond to the forces effective on the proof masses in directions parallel and perpendicular, respectively, to the direction of the path. The voltage K2 is connected to the input of a squarer 9. Between the input voltage $e$ and the output voltage $a$ of this squarer exists the general relation $a = e^2$. Squarers of this type are disclosed for instance in "Applications Manual for Computing Amplifiers for Modelling Measuring Manipulating & Much Else" edited 1966 by George A. Philbrick Researches, Inc., USA, page 52, section II. 25 and are commercially available als Model PSQ-P/N made by this corporation. Instead of using such a squarer it is also possible to apply a multiplier with both of its input terminals connected to the voltage K2. The output signal of the squarer 9 is connected with a summing network, for instance a summing amplifier, and subtracted there from a voltage $G^2$ which is proportional to the square of the weight of the proof mass. This voltage $G^2$ is an external dc-voltage connected with the terminal 14. The output of the summing network, which therefore has the magnitude $G^2 - K_2^2$ is effective on the input of a square root extracting function generator (rooter) 15, between the output $a$ and the input $e$ of which the general relation $a = \sqrt{e}$ is existing. Such rooters are known in the art, reference for this may be had to the above mentioned Philbrick Manual, page 52, section II. 24 or II. 25.

The output signal S of the rooter 15 is proportional to that component of the gravity which is effective on the proof mass in the direction of the sensitive axis 7 and is — in the shown position of the switch 11 — subtracted in a second summing network 12 from the signal K2 appearing at the output terminal 5 which is assigned to the other accelerometer. As mentioned in connection with FIG. 1, the voltage $m \cdot b$ appearing at the terminal 13 will therefore be proportional to the acceleration along the path, which voltage is of positive polarity at an acceleration and of negative polarity at a deceleration of the craft 1.

It should be mentioned that the weight G of the proof masses does not have to be known to apply a voltage proportional to $G^2$ to the input terminal 14. It is sufficient to adjust a dc-voltage at this terminal with the craft in a stationary state of the craft ($b = o$) until the output voltage at the terminal 13 becomes zero.

For obtaining the acceleration of the craft relative to the earth's gravity $g$ the input of a second rooter 15' can be connected to the input terminal 14. The output of the rooter 15' is connected to an input of a divider 16, thus dividing the output magnitude $m \cdot b$ of the summing network 12 by the weight $G$ of the proof mass. By this way the voltage at the output terminal would be proportional to $b/g$, where $b$ is the acceleration of the craft 1 along its path.

If the craft is moving downward with the accelerometers being situated at the rear end of the craft the switch 11 is to be brought into its other position. The polarity of the output signal S of the rooter 15 will then be changed by means of an inverted amplifier 18. The output voltage of this amplier is fed to the summing network 12. Again there will appear a voltage at the terminal 13 which is proportional to the acceleration of the craft 1 along its path and will be of positive polarity when the craft is accelerated and of negative polarity when the craft is decelerated.

Figure 2:
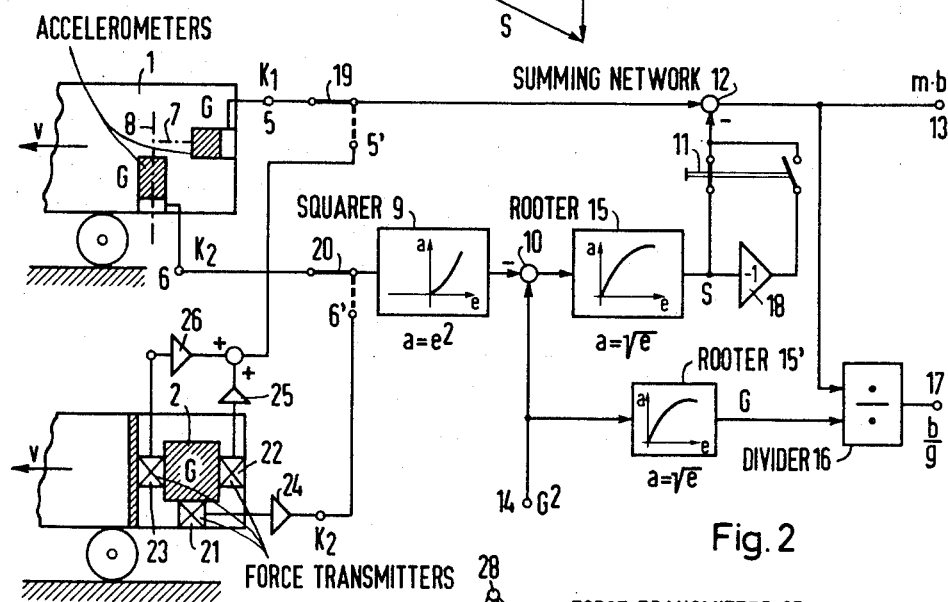
FIG. 2 shows an embodiment of the invention belonging thereto.

With the other modification of the arrangement shown in FIG. 2, which one obtains by putting the contacts 19 and 20 in their position indicated in FIG. 2 by dotted lines, only one proof mass 2 is needed. This proof mass with the weight G is supported in a direction perpendicular to the path by a piezoelectrical crystal 21 and is placed between two other piezoelectrical crystals 22 and 23, which are supported parallel to the direction of the path. Each of the piezoelectric crystals 21 – 23 is assigned to a charge amplifier 24 – 26. Charge amplifiers are known in the art and, for instance, disclosed in the periodical "Instrumentation and Control System," January 1965 or in section III. 41, page 83 of the aforementioned Philbrick Manual. If the piezoelectric crystal 22 would only respond electrically to forces opposite to the moving direction while the piezoelectric crystal 23 would only respond to forces in the moving direction the charge amplifier 26 assigned to the latter could be an amplifier with an inverting function, having an output polarity opposite to its input polarity, with his output signal added to the output signal of the charge amplifier 25. It is evident, however, that this inversion of the output voltage of the piezoelectric crystal 23 is equivalent to using a noninverting charge amplifier and a subtraction of his output signal from that of the output signal of the charge amplifier 25. Analogous to the formerly described modification of the arrangement of FIG. 2 there appears a voltage at the terminal 5°, which is proportional to the force on the proof mass opposite to the moving direction, this voltage having a negative polarity if a resulting force is effective on the proof mass in the moving direction.

Figure 3:
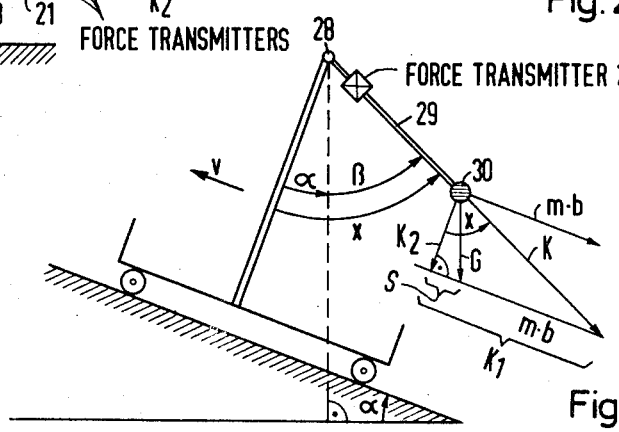
FIG. 3 is a modified vector diagram.

FIG. 3 shows a vector diagram for another implementation of the invention, which needs only one force transmitter. This force transmitter 27 is placed in the nearness of the pivot axis of a pendulum consisting of a rod 29 at the end of which is fixed a proof mass 30 which has the weight G and the mass $m$. The force transmitter 27 will be influenced by a force $K$ being effective in the direction of the rod 29. By the effect of the gravity alone the pendulum 29 would pivot on the angle $\alpha$ and if an acceleration in the direction of the arrow $v$ occurs, the pendulum would additionally pivot on the angle $\beta$. On the craft itself only the sum angle $x = \alpha + \beta$ is measurable. The vector diagram of FIG. 3 shows that the quantity $m \cdot b$, which is proportional to the acceleration of the craft along its path can be computed with the relation $m \cdot b = K \cdot \sin x \mp \sqrt{G^2 - K^2 \cos^2 x}$, the negative value of the square root being used when moving upwards and its positive value being used when moving downwards. The angle $x$ has to be counted in a positive sense, if the pendulum is pivoting — as shown in FIG. 3 — opposite to the moving direction of the craft and is to be counted in a negative sense if the pendulum is pivoting in the other direction.

Figure 4:
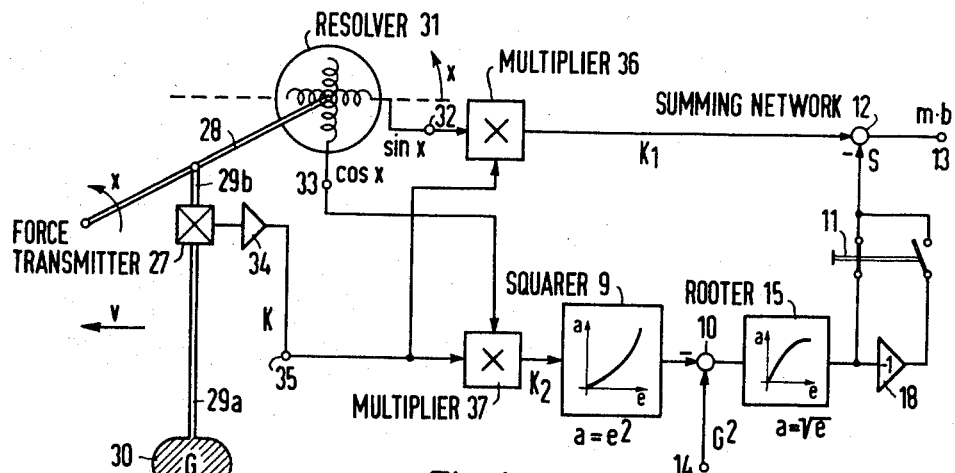
FIGS. 4 and 5 show two other embodiments of the invention, based thereupon.

In FIG. 4 is shown an implementation of the method explained in FIG. 3. Connected with a shaft 28 is the rotor of a resolver which supplies two terminals 32 and 33 with voltages proportional to the sine and the cosine of the pivot angle $x$. Two opposite sides of the force transmitter 27, a piezoelectrical crystal for instance, are fastened to two rods 29a and 29b. The end of the rod 29a is rigidly connected with the proof mass, the end of the rod 29b is rigidly connected to the shaft 28. The electrical output quantity of the force transmitter 27 is influencing a charge amplifier 34, the output of which supplies to the terminal 35 a voltage which is proportional to the force $K$ which is effective on the mass 30 in the direction of the rod 29a, b. terminals 32 and 35 are connected with the two inputs of a multiplier, the output signal of which therefore is $K_1 = K \cdot \sin x$. The inputs of a second multiplier 37 are connected with the terminals 33 and 35. The output of the multiplier 37 is $K_2 = K \cdot \cos x$. The quantities $K_1$ and $K_2$ are — analogously as described before — processed by the function generators 9 and 15 and the summing network 12 to obtain a signal $m \cdot b$ at the output terminal 13, which is proportional to the acceleration of the craft along its path.

Figure 5:
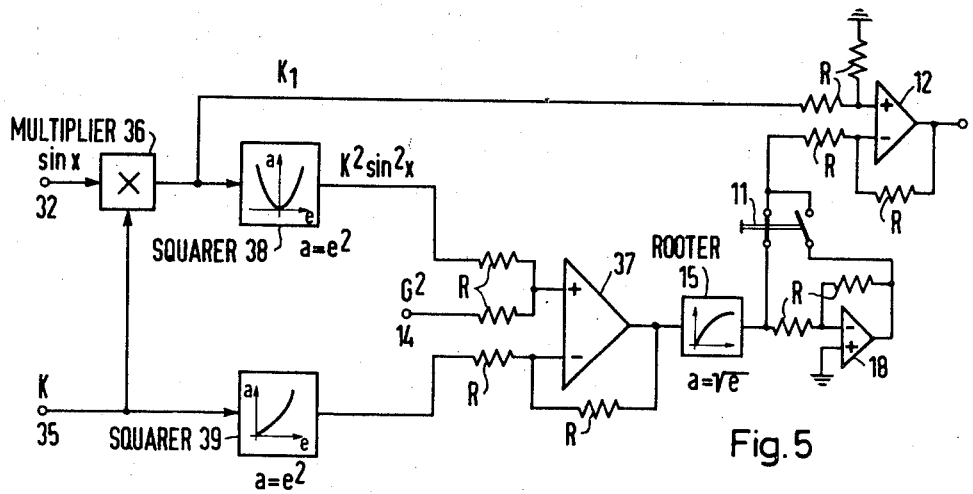

FIG. 5 shows a variant of the embodiment according to FIG. 4, in which a simpler resolver is used, this resolver having only to supply a signal which is proportional to the sine of the pivot angle $x$. This signal would be connected to the terminal 32. The terminal 35 is assumed to be connected with the output of the charge amplifier 34. The multiplier 36 again is influenced by the voltages appearing at the terminals 32 and 35; his output signal $K1 = K \sin x$ is fed to the input of a operational amplifier 12, representing a summing network. In computing the quantity $K_2 = K \cdot \cos x$ use is made of the relation $\cos^2 x = 1 - \sin^2 x$. Amplifier 37 is fed at his input designated by + with the output of a squarer 38, the input of which is connected to the multiplier 36. The voltage $G^2$ is supplied to the terminal 14, which is proportional to the square of the weight $G$ of the proof mass. The output quantity of the charge amplifier, appearing at the terminal 35, is fed to the amplifier input designated by — after having passed a second squarer 39. The output signal of the amplifier 37 therefore corresponds to that of the summing network 10 of FIG. 4 and is processed in the same manner by the elements 15, 18, 11 and 12.

FIG. 5 discloses the implementation of the summing networks 10 and 12 by operational amplifiers. These amplifiers are circuited as adder-subtractor-amplifiers; the sum of the electric conductances of the resistors connected to either amplifier input being equal.

The advantage of the embodiments shown in FIG. 4 and 5 lies in having to compensate only one force transmitter for drift or nonlinearities.

Figure 6:
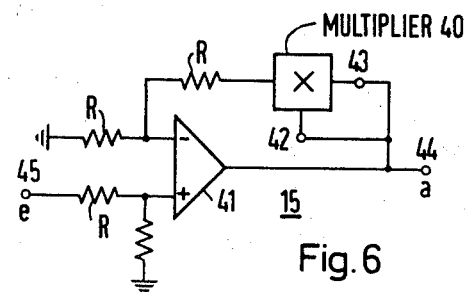
FIG. 6 shows an embodiment of a square root extracting function generator.

FIG. 6 shows a way to implement the rooter 15 or 15', respectively, by means of a multiplier 40, which is inserted in the feedback loop of a differential amplifier 41 having a high no-load gain. Both input terminals 42 and 43 of the multiplier 40 are connected to the terminal 44 at which the output voltage a of the amplifier 40 appears. The output of the multiplier 40 is connected through a resistor R with the amplifier input designated by —, while the input voltage $e$ at terminal 45 is connected by a second resistor R with the amplifier input designated by +. Both amplifier inputs are connected by two more resistors R with a reference potential, for instance grounding or earth potential. All the resistors R have the same electric conductance. It is also possible to implement the divider 16 with the circuit shown in FIG. 6, if the connection between the terminals 42 and 44 is interrupted. The terminal 42 could then be used as the dividend input and the terminal 45 as the divisor input. If the voltage applied to the terminal 42 is designated with $d$, the output voltage appearing at the terminal 44 would be $a = e/d$. It should be understood that the present disclosure is for the purpose of illustration only and that this invention includes all modifications and equivalents which fall within the scope of the appended claims.

What I claim is:

1. Apparatus for providing a measure of the linear acceleration of an object moving on an arbitrary inclined path, comprising proof mass means, first means connected to the proof mass means developing a first signal proportional to the force acting on the proof mass means in a direction parallel to the path, second means connected to the proof mass means for developing a second signal proportional to the force acting on the proof mass means in a direction perpendicular to the path, means for squaring said second signal to provide a third signal, means for generating a fourth signal proportional to the square of the weight of the proof mass, means to subtract the third signal from the fourth signal to provide a fifth signal, means to extract the square root of the fifth signal to provide a sixth signal, and means to sum the sixth and the fist signal.

2. Apparatus according to claim 1 wherein first and second means comprise piezoelectric crystals each of which is electrically connected to a charge amplifier.

3. Apparatus according to claim 1 wherein the first means comprises two piezoelectric crystals, one mounted on each side of the proof mass means along an axis parallel to the direction of the path, and the second means comprises a piezoelectric crystal supporting the proof mass means in a direction perpendicular to the direction of the path.

4. Apparatus according to claim 1 wherein the proof mass means is pendulously supported and rigidly connected with a shaft so as to allow pivoting about an axis, a piezoelectric crystal is mounted between the pivot axis and the proof mass means, the shaft is connected with the rotor of a resolver that produces an output signal equal to the sine of the angle the proof mass means pivot about said axis, said first means including a multiplier and developing said first signal by multiplying the output of said resolver and the output of said crystal.

5. Apparatus to claim 1 wherein the polarity of the sixth signal is made changeable by means of an inverter amplifier.

6. Apparatus according to claim 1 wherein the sum of the first and sixth signal is fed to the dividend input of a divider, the divisor input of which is connected to means for generating a signal proportional to the weight of the proof mass.

7. Apparatus according to claim 1 wherein the means for squaring the second signal comprises a differential amplifier with a high no-load gain, the output signal of said amplifier is squared by a multiplier, whose output signal is fed back negatively to the input of said differential amplifier.

8. Apparatus according to claim 1 wherein first proof mass means and the first means are combined to a first accelerometer with its sensitive axis placed in a direction parallel to the path for developing the first signal, and second proof mass means and the second means are combined to a second, identically built accelerometer with its sensitive axis placed in a direction perpendicular to the path for developing the second signal.

* * * * *